(12) United States Patent
Pollock (10) Patent No.: US 10,288,382 B1
(45) Date of Patent: May 14, 2019

(54) SIGHT SCOPE AND MOUNTING ASSEMBLY (71) Applicant: Michael Pollock, South Lyon, MI (US)

(72) Inventor: Michael Pollock, South Lyon, MI (US)

( * ) Notice: Subject to any disclaimer, the term of this patent is extended or adjusted under 35 U.S.C. 154(b) by 178 days.

(21) Appl. No.: 15/098,348

(22) Filed: Apr. 14, 2016

(51) Int. Cl.
| *G02B 23/00* | (2006.01) |
| *F41G 11/00* | (2006.01) |
| *F16M 13/02* | (2006.01) |
| *F16M 11/20* | (2006.01) |
| *F16M 11/06* | (2006.01) |
| *G02B 27/64* | (2006.01) |
| *G02B 23/16* | (2006.01) |

(52) U.S. Cl.
CPC ............. *F41G 11/00* (2013.01); *F16M 11/06* (2013.01); *F16M 11/2007* (2013.01); *F16M 13/02* (2013.01); *G02B 23/16* (2013.01); *G02B 27/646* (2013.01)

(58) Field of Classification Search
CPC . F41G 1/38; F41G 1/387; F41G 1/393; F41G 1/41; F41G 1/54; F41G 1/545; F41G 11/00; F41G 11/001; F41G 11/002; F41G 11/003; F41G 11/0074; F41G 11/005; F41G 11/006; F41G 11/007; F41G 11/008; G02B 23/00; G02B 23/16; G02B 23/18

USPC ....... 359/362, 399, 421, 422, 423, 424, 428, 359/429, 432, 434, 435; 42/90, 111, 119, 42/122, 124, 125, 126, 127, 128, 130, 42/148
See application file for complete search history.

(56) References Cited

U.S. PATENT DOCUMENTS

| 3,358,504 A * | 12/1967 | Freebairn ................ F41A 23/16 73/167 |
| 5,876,005 A * | 3/1999 | Vasconi ................ F16M 11/10 248/276.1 |
| 2008/0047189 A1* | 2/2008 | Potterfield ............. F41A 23/16 42/94 |
| 2012/0266746 A1* | 10/2012 | Hodge .................... F41A 27/06 89/41.05 |
| 2013/0087961 A1* | 4/2013 | Weissenborn ......... A63C 11/26 269/45 |

* cited by examiner

*Primary Examiner* — Arnel C Lavarias
(74) *Attorney, Agent, or Firm* — L.C. Begin & Associates, PLLC (57) ABSTRACT

A target sight scope mounting assembly is presented. Additionally, a target sight scope and a plurality of support members are configured to provide a support for the target sight scope. The scope is coupled to one of the support members and pivotally engages the support member. A dampening material may be integrated within at least the first support member thereby dampening the vibrations attendant to a shooting environment.

14 Claims, 5 Drawing Sheets

SIGHT SCOPE AND MOUNTING ASSEMBLY

BACKGROUND OF THE INVENTION

The present invention relates to sight scopes mounting assemblies. Sight scopes or sighting scopes are typically used to evaluate the accuracy of a shooter on a rifle or weapons range. The sight scope enables the shooter to view the target and the point of impact of each round or bullet that passes through the target, once a shot has been fired for example. It may also be used to simply evaluate the pattern or grouping of a plurality of shots taken at a known distance.

One challenge that the user of the scope often encounters is maintaining the orientation of the scope in a fixed position such that a quick and ready examination of the target may be made immediately upon firing a shot at the target. This is especially pertinent during competitive settings. If the scope is not maintained or oriented in a fixed position, then the scope must be re-aligned with the target and if necessary, refocused upon each shot. It would therefore be an improvement in the art to provide an improved mounting assembly for the scope, thereby increasing the efficiency of its use.

SUMMARY OF THE INVENTION

The above-referenced concerns are resolved by a novel mounting assembly for a sight scope. A base is provided to provide a platform for the assembly whereby the base may be permanently or removably fixed to a gun rest or table, or to the ground, thereby providing ready access to a shooter that is firing from the gun table, or one that is sitting, prone, or in a standing position. A vertical stanchion or beam is secured to the base and extends upwardly, thereby constituting a main support for a scope attached thereto. A dampening material, such as concrete or foam, may be housed within the vertical stanchion if desired. A mounting subassembly is secured to the vertical stanchion for removably fixing a scope thereto. A male threaded receiver or other mount extends from the mounting subassembly for receipt of an associated sight scope. The scope is designed to contain a second mount along its body, thereby fixing a female threaded receiver, for mating with the male threaded receiver on the mounting subassembly. A bearing, such as a golf ball or other spherical member, is provided within the female receiver, thereby providing an adjustable seat for the scope as the female receiver is desirably positioned about the bearing once the female receiver is theadedly received by the male receiver.

The mounting subassembly may be rigidly formed to contain a second beam preferably extending horizontally or orthogonally from the vertical stanchion. A third beam constitutes a secondary vertical stanchion that angularly extends from the horizontal or second beam 90 degrees therefrom, or, in other angular configuration extending between 90 and 180 degrees from the horizontal beam. It will be appreciated that the third beam may be fixed at a desired angle, or, it may be adjustably secured to a desired angle relative to the horizontal beam.

In yet another embodiment, the mounting subassembly may be mounted to a structural beam or member that is proximate to an associated gun rest or gun table, whereby the structural beam essentially provides a support in lieu of the vertical stanchion. The sight scope may then be utilized or accessed as it extends off the side of the structural beam, thereby simplifying the overall sight scope mounting assembly.

In sum, the present invention may be described as a sight scope mounting assembly containing a first vertical support member, a second support member angularly extending from and connected to the first vertical support member, and a third vertical support member angularly extending from and connected to the second support member. A first receiving member extends from and is fixed to the third vertical support member, for releasably fixing a scope thereto. A second receiving member contains a scope mount for coupling a scope thereto, the second receiving member releasably coupled to the first receiving member, when the scope is mounted on the assembly.

DETAILED DESCRIPTION OF THE PREFERRED EMBODIMENT(S)

Figure 1:
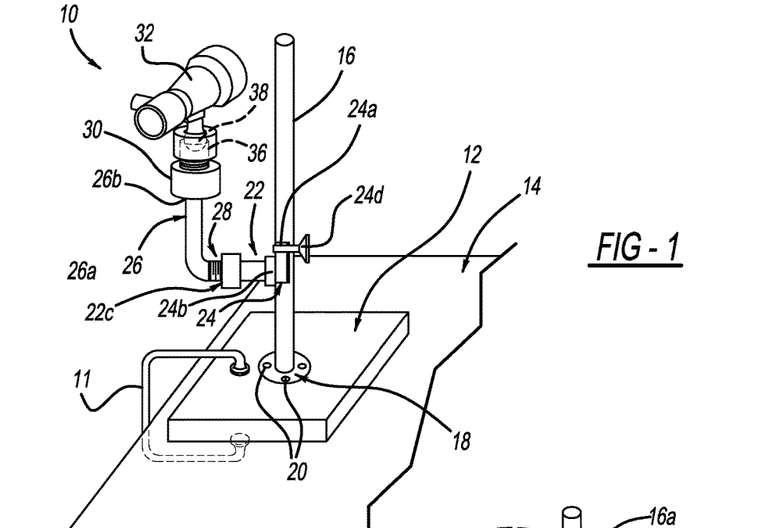
FIG. 1 illustrates a perspective view of one embodiment of a sight scope mounting assembly in accordance with the present invention.

FIG. 1 is an illustration of a perspective view of a first embodiment of a sight scope mounting assembly 10. A base 12 provides a platform for anchoring other constituents of the mounting assembly 10. Furthermore, the base 12 may itself be anchored to a secondary platform such as a weapons or rifle range table 14, thereby positioning the sight scope and its mounting assembly 10 proximate to the shooter.

Figure 2:
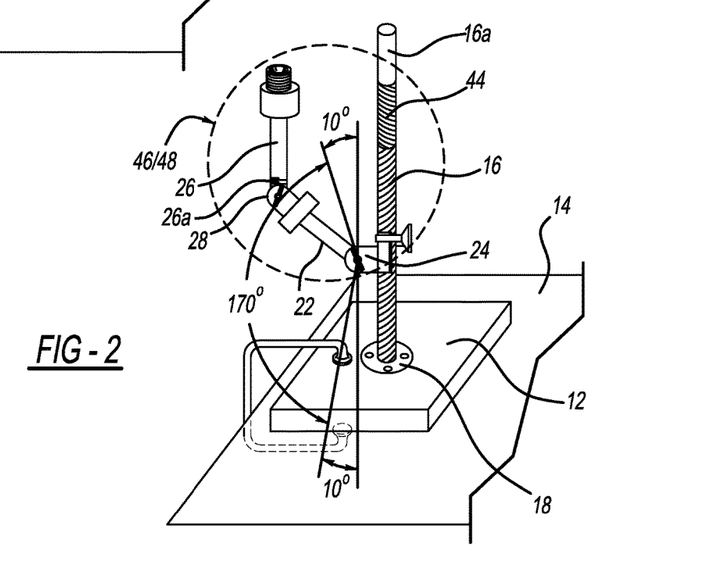
FIG. 2 illustrates a perspective view of one embodiment of a sight scope mounting assembly in accordance with the present invention.

A first support member or stanchion 16 may be fixed to the base 12, in a generally upright position, by attaching the first support member 16 to a secondary base 18. As shown in FIG. 1, for example, the first support member 16 is preferably positioned orthogonal to the base 12 by anchoring the secondary base 18 to the primary base 12. The first support member 16 may be threadedly received by the secondary base 18, for example, and then screwed into the primary base 12 by driving exemplary wood screws 20 into an exemplary wooden primary base 12. Other suitable materials and attachment methods relative to the various constituents are of course contemplated. For example, and not by way of limitation, the base 12 may be made of wood; the first support member 16 may be a galvanized steel tube or a polyvinyl chloride pipe; and, the secondary base 18 may be made of a one-inch galvanized steel flange or a one-inch polyvinyl chloride flange. Furthermore, a preferred wooden or plywood base 12 may be glued to a preferred wooden or plywood secondary platform 14 by using known wood glue or construction adhesive, and clamping until dry. It will be further appreciated that as the support members 22 and 26 are selectively extended further from support member 16, as shown in FIG. 2, for example, one of ordinary skill in the art will appreciate that a larger base 12 and/or a larger secondary platform 14 may be necessary to ensure stability of the assembly 10.

A second support member 22 may be coupled to and angularly extend from the first support member 16, in a generally horizontal position relative to the first support member 16, for example. Other angular displacements of the second support member 22 relative to the first support member 16 are also contemplated. As shown in FIG. 1, a first union 24 couples the first support member 16 to the second support member 22. The first union 24 may be fixed to provide a fixed angular displacement of the second support member 22 as shown in FIG. 1, at 90 degrees for example, or, the first union 24 may be adjustably fixed by providing an adjustable union 24 as shown in FIG. 2, rather than a fixed union. Accordingly, an adjustable union may facilitate the variability of the angular displacement of the second support member 22 from the first support member 16, similar to adjusting the angular displacement of a flag pole for example as it is mounted on a stanchion. As such, a plurality of angular settings may be provided by the first union 24 if desired. As shown in FIG. 1, a preferred angular displacement of the second support member 22 from the first support member 16 is equal or approximate to 90 degrees. A preferred range of angular displacement of the second support member 22 from the first support member 16 is equal to or about 10 degrees to about 170 degrees as shown in FIG. 2.

A third support member 26 may be coupled to and angularly extend from the second support member 22, in a generally upright position relative to the second support member 22, for example. Other angular displacements of the third support member 26 relative to the second support member 22 are also contemplated. As shown in FIG. 1, a second union 28 couples the second support member 22 to the third support member 26. The second union 28 may be fixed to provide a fixed angular displacement of the third support member 26 as shown in FIG. 1, at 90 degrees for example from the second support member 22, or, the second union 26 may be adjustably fixed by providing an adjustable union 26 as shown in FIG. 2, rather than a fixed union 26 as shown in FIG. 1. Accordingly, an adjustable union facilitates the selection and variability of the angular displacement of the third support member 26 from the second support member 22, again similar to adjusting the angular displacement of a flag pole for example as it is mounted on a stanchion. As such, a plurality of angular settings may also be provided by the second union 28, if desired. As shown in FIG. 1, a preferred angular displacement of the third support member 26 from the second support member 28 is equal or approximate to 90 degrees. A preferred range of angular displacement of the third support member 22 from the second support member 22 is equal to or about 10 degrees to about 170 degrees as shown in FIG. 2.

Figure 3:
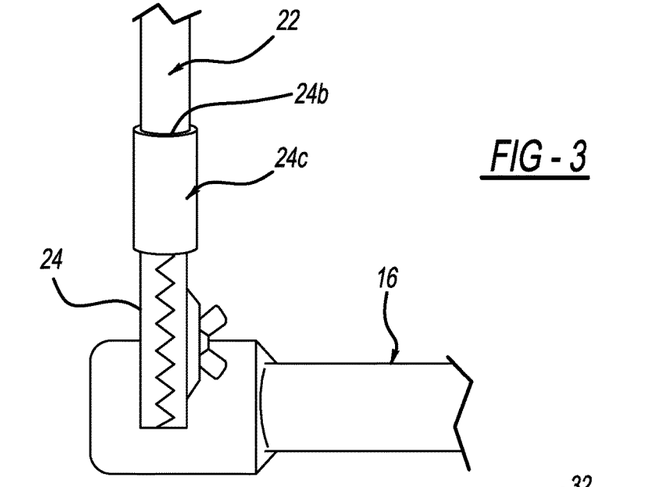
FIG. 3 exemplifies an exemplary union of the present invention.

One exemplary type of union that may be used for the first union 24 includes a union having a semi-tubular or c-shaped clamp 24a when viewed in cross-section. The semi-tubular clamp 24a is press fit about a tubular-shaped first support member 16. See FIG. 1. As further shown, a compression ring clamp 24d secures or fixes the first union clamp 24a about the first support member 16. A socket 24b is integral to the clamp 24a and as clamp 24a is fit about the first support member 16, the socket 24b angularly extends from the first support member 16 for receipt of the second support member 22. An end 22a of the second support member 22 may be threaded and the socket 24b may also be threaded such that the end 22a of the second support member 22 may be threadedly received by the socket 24b. Alternatively, the socket 24b may extend from an adjustable portion 24c of the union 24, as shown in FIG. 3, for receipt of the second support member 22.

In the same way, one type of union that may be used for the second union 28 may simply include a threaded receiver 22c at a second end 22b of the second support member 22. An elbowed portion 26a, or, as shown in FIG. 2, an angularly adjustable portion 26a of the third support member 26 may be threadedly received in the threaded receiver 22c. It will be appreciated that other types of known unions may also be used for either the first union 24 or the second union 28.

As shown in FIG. 1, a first receiver 30 is located at a second end 26b of the third vertical support member 26 for receipt of a target sight scope 32, and actually constitutes a part of the third support member 26. The first receiver 30, for example, may be formed as a threaded male component for receipt of a threaded female component as explained immediately below. Further, in accordance with the present embodiments of the invention, the first receiver 30 may if desired be formed as a one-half (½) inch threaded male polyvinyl chloride (PVC) connector with a three-fourths (¾) inch female end whereby the male end is connected to a one-half (½) inch polyvinyl chloride threaded female connector 36 as explained below.

Figure 4:
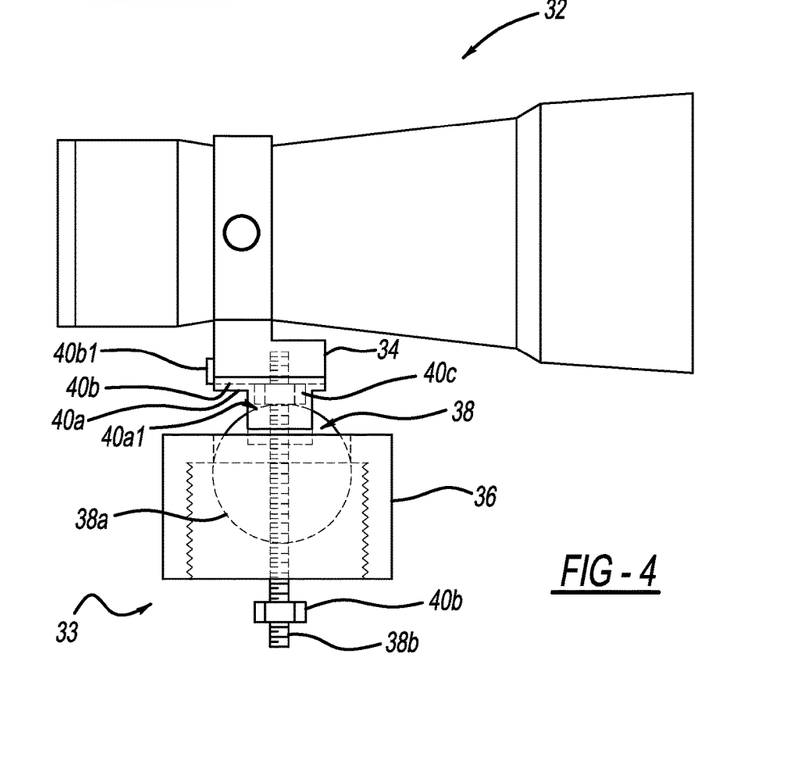
FIG. 4 exemplifies a swivel ball mount or mounting subassembly in accordance with the present invention.
Figure 7:
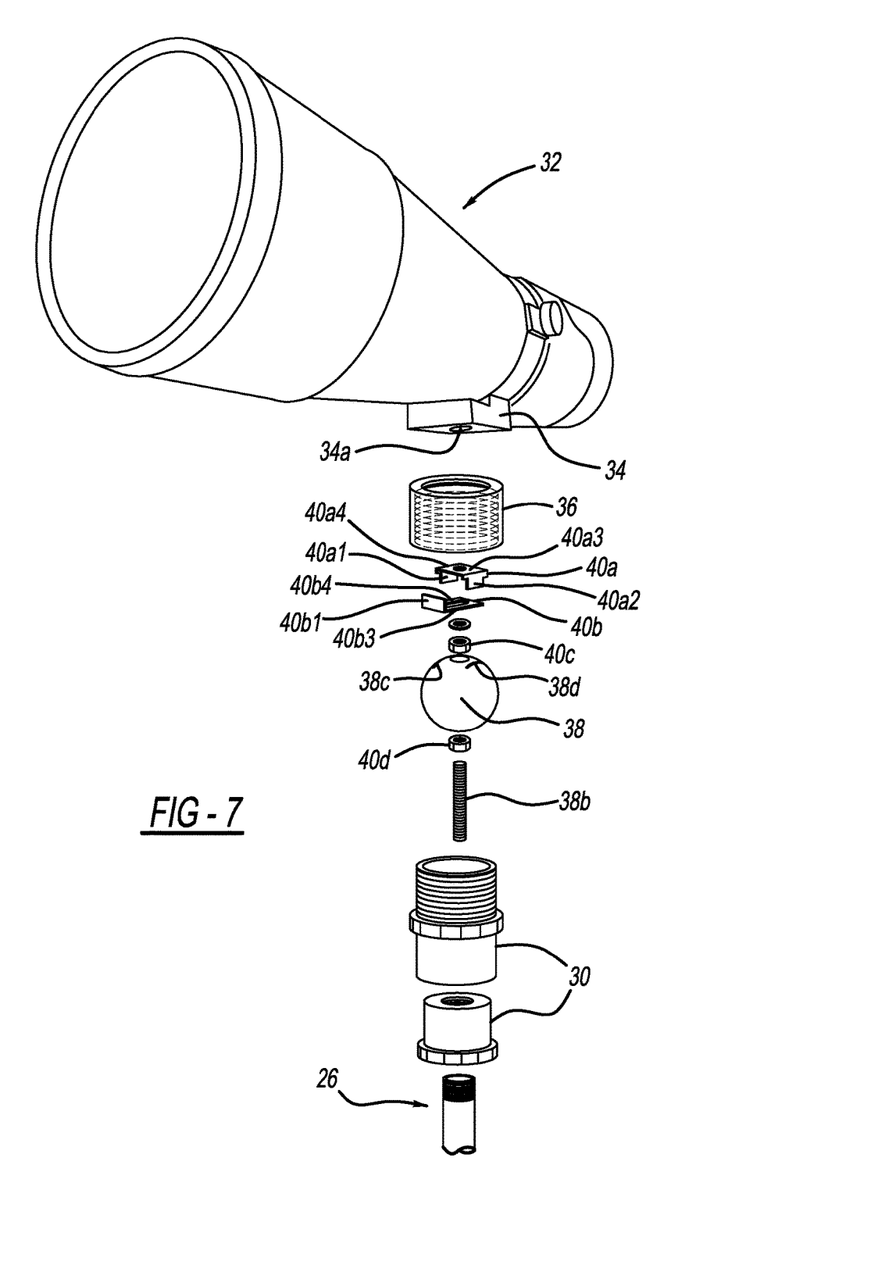
FIG. 7 is an exploded view illustrating the components used to assemble the mounting subassembly or swivel ball mount.
Figure 8:
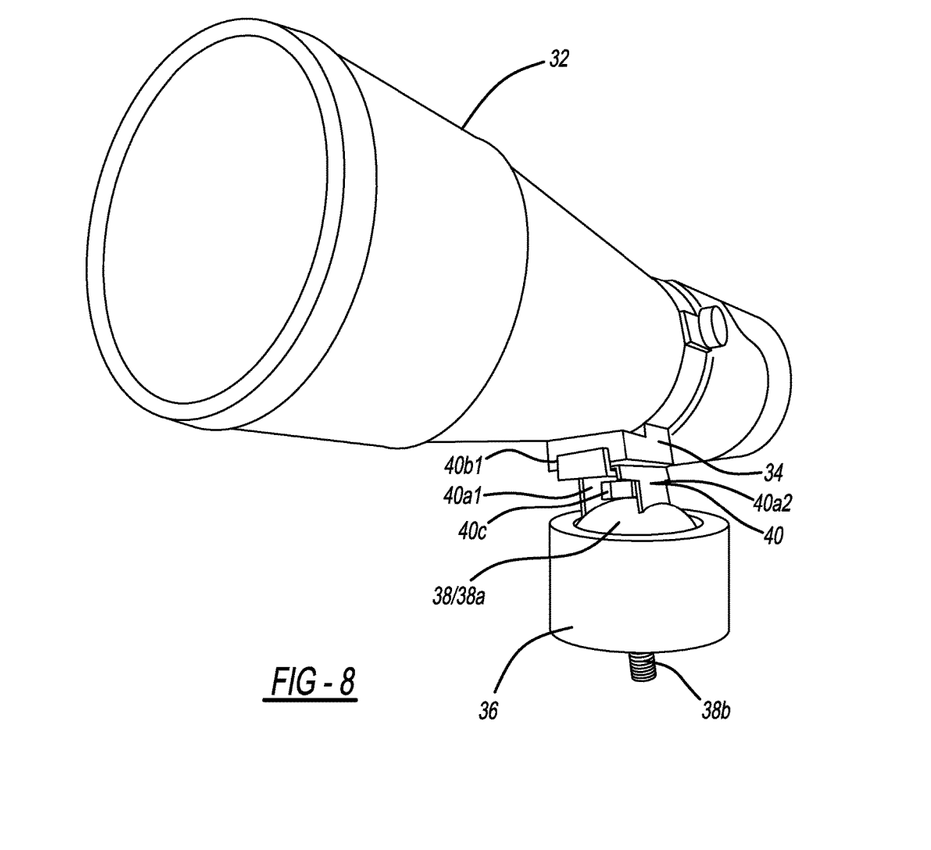
FIG. 8 further illustrates the mounting subassembly or the swivel ball mount.

As shown in FIG. 4, FIG. 7, and FIG. 8, a mounting subassembly 33, or swivel ball mount 33, may be attached to a scope 32 contains a coupling member or scope platform 34 for receipt of a complementary coupling member of the mounting assembly 10. An exemplary, but not limiting, general parts list of the mounting subassembly 33, may contain the following:

1. ½" plastic female threaded connector increased to a 1½" male smooth connector (first receiver 30)
2. 1½" female smooth connector to a 1½" threaded male connector piece (first receiver 30) (in one embodiment, the male smooth connector of item no. 1 is glued into the female smooth connector of item no. 2 to form "first receiver 30" as described in this specification)
3. 1½" male threaded to 1½" smooth female with smooth 1¼" non-threaded end. (second receiver 36)
4. Ball Joint 38 (e.g. golf ball) has an approximate 1.680 inch diameter and an orifice 38a drilled 17/64 " through the center of the ball joint 38, and containing slots (38c, 38d)
5. ¼" by 20 threaded rod 2¾" long (bolt 38b)
6. ¾"×1/16"×¾" aluminum rectangular bar (second portion 40b) (with ⅜" 90 degree angular lip (40b1))
7. ¾"×1/16" aluminum U-channel 1⅜" long (first portion 40a)
8. 2, ¼"×20 threaded nuts (40c, 40d) and a ¼" locknut As further shown in FIGS. 4, 7, and/or 8, a threaded aperture 34a is formed and/or fixed within the coupling member 34 for receipt of a threaded male member. A threaded rod or bolt 38b is screwed into the threaded aperture 34a of the coupling member 34, perhaps three to five threads, to fix the bolt 38b within the coupling member 34. As shown in FIG. 7, a second coupling member 40 contains a first portion 40a and a second portion 40b. The first portion 40a contains a first prong 40a1 orthogonally extending from a flat portion 40a3, and a second prong 40a2 also orthogonally extending from the flat portion 40a3, spaced apart and opposite to the first prong 40a1. The first portion 40a also contains a first orifice 40a4 protruding through the flat portion 40a3 of the first portion 40a.

With regard to the second portion 40b, an angular lip 40b1 extends from a second flat portion 40b3, for locking the second portion 40b against the coupling member or scope platform 34 of the scope. A second orifice 40b4 passes through a middle point on the second flat portion 40b3. The first portion 40a is slid down the bolt 38b by passing the bolt 38b through the first orifice 40a4, whereby the first flat portion 40a3 of the first portion 40a flatly rests against the first coupling member 34, and the first and second prongs 40a1 and 40a2 extend vertically downwardly from the bottom of the scope, away from the coupling member 34. The second portion 40b is next slid down the bolt 38 by passing the bolt 38b through the second orifice 40b4 until the second flat portion 40b3 flatly rests against the first flat portion 40a3. When the second portion 40b is properly positioned against the first portion 40a, the lip 40b1 angularly and upwardly extends from the second flat portion 40b3 alongside a portion of the first coupling member or scope platform 34, toward the bottom of the scope. A nut 40c is then tightened down the bolt 38b to provide a snug fit of the second coupling member 40 against the first coupling member 34. Finally, as discussed below, a threaded female second receiver 36 is placed over the bolt 38d with the female threaded side facing downwardly from the scope.

A ball joint 38, contains a third orifice 38a axially extending through a medial or central portion of the ball joint 38. A pair of slots, 38c and 38d, are formed alongside the third orifice 38a, and on opposite sides thereof, whereby the slots 38c and 38d correspondingly mate to the first and second prongs, 40a1 and 40a2. When assembling the mounting subassembly 33, the ball joint 38 is slid down the bolt 38b through the orifice 38a, such that the first and second prongs 40a1 and 40a2 are respectively at least partially encased within corresponding slots 38b and 38c. The bolt 38b is long enough to extend through the ball joint 38 such that a second nut 40d may be snugged against the ball joint 38, thereby retaining the ball joint 38 within an interior of the second receiver 36. Once the ball joint is snugged within the receiver 36, the mounting subassembly 33 is fully assembled.

A second receiver 36 may also be a threaded receiver, and more specifically, a threaded female receiver that complements and threadedly receives the first receiver 30. As discussed above, the ball joint 38, made from a golf ball, bearing, or other spherical member for example, is contained within the second receiver 36, such that the second receiver 36 is loosely and pivotally arranged about the ball joint 38. As also discussed above, the second coupling member 40 is fixed to the ball joint 38, whereby the second coupling member 40 is fixed to the first coupling member 34 thereby securing the ball joint 38 to the scope 32. As shown in FIG. 4, the ball joint 38 may contain the coupling member 40 on the ball joint surface 38a, and a bolt 40b may extend from the scope 32 through the coupling member 40 and then through the ball joint 38. A nut 40c is then tightened about the bolt 38b, thereby tightening the bearing or ball joint 38 within the interior 36b of the second receiver 36, and thereby collating or joining the receiver 36/ball joint 38 assembly to the scope 32. Because the ball joint 38 is contained within the second receiver 36, a portion 36a of the second receiver is impinged between the ball joint 38 and the scope 32, thereby loosely fixing the second receiver 36 to the scope 32.

By virtue of the "loose" second receiver 36 about the ball joint 38, the second receiver 36 may threadedly receive the first receiver 30 as the second receiver 36 is tightened about the first receiver 30, thereby pivotally mounting the scope 32 to the second end 26b of the third support member 26. The pivotal engagement of the scope 32 permits the adjustment of the scope while yet maintaining a fixed position of the scope mounting assembly 10 proximate to the firing position of the shooter. When assembled, the second receiver 36 is tightened to a snug fit about the first receiver 30, thereby fixing the scope 32 to the desired position.

Figures 5, 6:
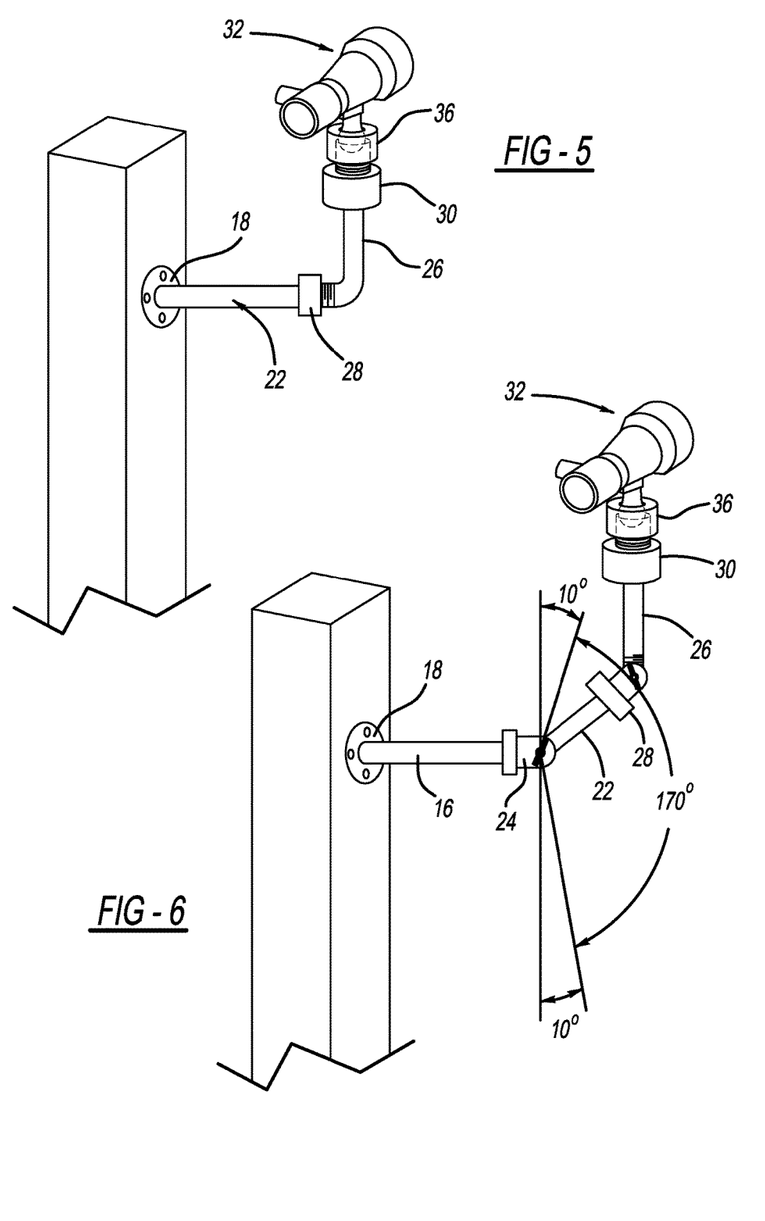
FIG. 5 exemplifies installation of yet another embodiment of a sight scope mounting assembly on an independent structural member.
FIG. 6 exemplifies yet another embodiment of a sight scope mounting assembly on an independent structural member.

The embodiment of FIG. 1 is further shown in FIG. 5, wherein the second support member 22 may be formed as a fixed feature of the scope mounting assembly 10 and contain a different plurality of constituents as next described. Measurements are provided for some of the parts, but one of ordinary skill in the art will readily appreciate that various sized pipes and fittings may be interchangeably used depending on the design criteria. A polyvinyl chloride t-connector 22d, essentially forming the union 24, contains a one-inch open c-shaped side 22d1 and a three-fourths inch threaded male connector 22d2. The c-shaped portion 22d1 of the second support member 22 is clamped or snapped over the first support member 16 by using a standard radiator hose clamp—(with key handle MP) 23 or any other ring clamp 23. A three-fourths inch connector female end 22e may at one end be glued into a one and one-half inch polyvinyl chloride pipe 22f, and, the three-fourths inch connector female end 22e may also at an opposite end be threadedly received by the three-fourths inch male threaded connector 22d2. As described below, a third support member 26 may contain a plurality of constituents, as does the second support member 22. A three-fourths (¾) inch 90 degree elbow 26c has a lower end 26c1 that is glued into the one and one-half inch polyvinyl chloride pipe 22f. An upper end 26c2 of the elbow 26c is glued onto a lower end of a three-fourths (¾) inch by one and one-half (1½) inch schedule 40 polyvinyl chloride pipe 26b. The receiver 30 as described above is connected to an upper end of the pipe 26b. The ball joint 38 and the related supporting structure used to mount the scope is as described above.

In yet another aspect of the invention, a dampening material 44 may be inserted or cured within the interior 16a of the first support member 16 (or within any other support member), thereby providing a dampener to mitigate the vibrations attendant to the discharge of weapons proximate to the scope 32 and its mounting assembly 32. For example, concrete or foam may be poured within the tube or support member 16 thereby providing a stronger and more substantive support member 16 in addition to dampening ambient vibrations. Alternatively, the first support member 16 may be a solid support structure made from wood or some other solid material, thereby still providing a dampening effect. A preferred dampener 44 has been found to be concrete.

In yet another aspect of the invention, the target sight scope mounting assembly 10 may contain a mounting subassembly 46 containing just the second support member 22 and the third support member 26 along with the first union 24, the second union 28, and the first receiver 30 as described above. The first union 24 may be attached to a structural member 48 such as a six inch by six inch pillar or stanchion 48 used to support a roof over the firing area of the range, for example. See FIG. 5 that exemplifies sight scope mounting assemblies of the present invention mounted on various structures other than the first support member 16.

It will be understood that the foregoing descriptions of embodiments of the present invention are for illustrative purposes only and should not be construed as limiting the scope of the invention as stated in the appended claims. As such, the various structural and operational features herein disclosed are susceptible to a number of modifications commensurate with the abilities of one of ordinary skill in the art, none of which departs from the various permutations described herein.

What is claimed is:

1. A sight scope and mounting assembly comprising:
   a sight scope containing a coupling member;
   a mounting subassembly containing a first vertical support member, a second support member angularly extending from the first vertical support member, and a third vertical support member angularly extending from said second support member;
   a first receiving member extending from the third vertical support member, for releasably fixing said scope thereto;
   a second receiving member containing a scope mount for coupling said coupling member of said scope thereto, said second receiving member adapted to be releasably coupled to said first receiving member; and
   a bearing contained within said second receiving member and attached to said scope, said second receiving member pivotally mounted about said bearing.

2. The sight scope mounting assembly of claim 1 further comprising a dampening material contained within said first vertical support member.

3. The sight scope mounting assembly of claim 2 wherein said dampening material is selected from foam, concrete, and mixtures thereof.

4. The sight scope mounting assembly of claim 1 wherein at least one of said first, second, or third support members contain a dampening material.

5. The sight scope mounting assembly of claim 1 wherein said first vertical support member is a solid member.

6. The sight scope mounting assembly of claim 1 wherein said first vertical support member is a hollow member.

7. The sight scope mounting assembly of claim 1 wherein said second support member angularly extends at about ninety degrees from said first vertical support member.

8. The sight scope mounting assembly of claim 7 wherein said third vertical support member angularly extends at about ninety degrees from said second support member.

9. The sight scope mounting assembly of claim 1 further comprising an adjustable joint coupling said first vertical support member to said second support member, whereby said second support member may be adjusted to an angular displacement ranging between 10 to 170 degrees relative to said first vertical support member.

10. The sight scope mounting assembly of claim 1 further comprising an adjustable joint coupling said second support member to said third vertical support member, whereby said third vertical support member may be adjusted to an angular displacement ranging between 10 to 180 degrees relative to said second support member.

11. The light scope mounting assembly of claim 1 wherein said first receiving member threadedly receives said second receiving member.

12. A sight scope and mounting assembly comprising:
    a sighting scope;
    a mounting subassembly containing a first vertical support member, a second support member angularly extending from the first vertical support member, and a third vertical support member angularly extending from said second support member;
    a first receiving member extending from the third vertical support member, for releasably fixing said scope thereto;
    a second receiving member containing a scope mount for coupling said scope thereto, said second receiving member adapted to be releasably coupled to said first receiving member;
    a first coupling member adapted to fit on said sighting scope, for coupling to said scope mount, whereby said second receiving member is thereby attached to said scope; and
    a bearing contained within said second receiving member and attached to said scope, said second receiving member pivotally mounted about said bearing.

13. A sight scope mounting assembly comprising:
    a mounting subassembly containing a first vertical support member, a second support member angularly extending from the first vertical support member, and a third vertical support member angularly extending from said second support member;
    a first receiving member extending from the third vertical support member, said first receiving member adapted to releasably fix a sight scope thereto;
    a second receiving member containing a scope mount, said second receiving member adapted to couple a scope thereto and said second receiving member adapted to be releasably coupled to said first receiving member; and
    a bearing contained within said second receiving member, said bearing adapted to pivotally connect a sight scope thereto.

14. The sight scope mounting assembly of claim 13 further comprising:
    a sight scope releasably fixed to said first receiving member, and pivotally connected to said second receiving member and said bearing.

* * * * *

UNITED STATES PATENT AND TRADEMARK OFFICE
CERTIFICATE OF CORRECTION

PATENT NO. : 10,288,382 B1
APPLICATION NO. : 15/098348
DATED : May 14, 2019
INVENTOR(S) : Michael Pollock

Page 1 of 1

It is certified that error appears in the above-identified patent and that said Letters Patent is hereby corrected as shown below:

In the Specification

Column 4, Line 45; Please delete "1 1/4" and insert --1 1/2--

Signed and Sealed this
Twentieth Day of August, 2019

Andrei Iancu
*Director of the United States Patent and Trademark Office*